United States Patent [19]
Cragoe, Jr. et al.

[11] 3,794,734
[45] Feb. 26, 1974

[54] METHODS OF TREATING EDEMA AND HYPERTENSION USING CERTAIN 2-AMINOETHYLPHENOLS

[75] Inventors: Edward J. Cragoe, Jr., Lansdale; Everett M. Schultz, Ambler, both of Pa.

[73] Assignee: Merck & Co. Inc., Rahway, N.J.

[22] Filed: Mar. 3, 1971

[21] Appl. No.: 120,730

[52] U.S. Cl. .............................................. 424/330
[51] Int. Cl. ......................................... A61k 27/00
[58] Field of Search.................. 424/330; 260/570.9

[56] References Cited
UNITED STATES PATENTS

| | | | |
|---|---|---|---|
| 3,399,226 | 8/1968 | Saaki | 260/471 |
| 3,219,701 | 11/1965 | O'Shea | 260/569 |
| 3,457,354 | 7/1969 | Stone | 425/330 |
| 3,219,700 | 11/1965 | O'Shea et al. | 260/569 |
| 3,225,099 | 12/1965 | Coffield | 260/570.9 |

*Primary Examiner*—Sam Rosen
*Assistant Examiner*—Leonard Schenkman
*Attorney, Agent, or Firm*—Michael C. Sudol, Jr.

[57] ABSTRACT

2-Aminomethylphenol products and their non-toxic, pharmaceutically acceptable salts, compositions containing 2-aminomethylphenols as their active ingredient and methods useful in the treatment of edema and/or hypertension are disclosed.

9 Claims, No Drawings

METHODS OF TREATING EDEMA AND HYPERTENSION USING CERTAIN 2-AMINOETHYLPHENOLS

This invention relates to 2-aminomethylphenols, compositions containing a 2-aminomethylphenol as the active ingredient and methods of treatment of edema and/or hypertension. Particularly, it relates to compositions wherein the active ingredient is a 2-aminomethylphenol or its non-toxic, pharmaceutically acceptable salts.

Pharmacological studies employing rats and dogs as the experimental animals indicate that the instant products and compositions containing the active products are effective diuretic and saluretic agents which can be used in the treatment of conditions associated with electrolyte and fluid retention and hypertension. When administered in therapeutic dosages in conventional vehicles, the instant products effectively reduce the amount of sodium and chloride ions in the body, lower dangerous excesses of fluid level to acceptable levels and, in general, alleviate conditions usually associated with edema and hypertension.

In accordance with the present invention, there are employed in the compositions for treating edema and/or hypertension an active ingredient having the formula:

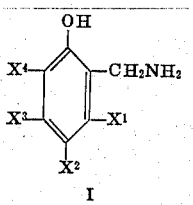

I wherein $X^1$ is hydrogen, lower alkyl, for example, methyl, ethyl, n-propyl, butyl, tert-butyl and the like, halo such as chloro, bromo, fluoro, iodo and the like or lower alkoxy such as methoxy, ethoxy, propoxy and the like; $X^2$ is halo such as chloro, fluoro, bromo, iodo and the like, lower alkyl such as methyl, ethyl, n-propyl, n-butyl, tert-butyl, 1-methylhexyl and the like, mononuclear aryl such as phenyl and the like or cycloalkyl, for example, cycloalkyl containing five to six carbon atoms such as cyclopentyl, cyclohexyl and the like; $X^3$ is hydrogen, lower alkyl such as methyl, ethyl, n-propyl, n-butyl, tert-butyl and the like, halo such as chloro, bromo, fluoro, iodo and the like or lower alkoxy such as methoxy, ethoxy, propoxy and the like and $X^4$ is hydrogen, halo such as chloro, bromo, fluoro, iodo and the like, lower alkyl such as methyl, ethyl, n-propyl, n-butyl and the like or trihalomethyl such as trifluoromethyl and the like. Also included are their non-toxic, pharmaceutically acceptable salts, preferably the non-toxic, pharmaceutically acceptable acid addition salts derived from hydrochloric acid, hydrobromic acid, hydroiodic acid, sulfuric acid, methanesulfonic acid, isethionic acid and the like; salts may also be prepared from the alkali metal bases such as sodium hydroxide, potassium hydroxide and the like.

A preferred embodiment of this invention relates to compositions having as their active ingredient 2-aminomethylphenols of the following formula:

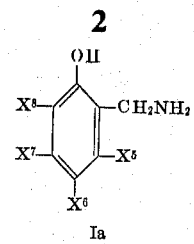

Ia wherein $X^5$ is hydrogen or halo such as chloro, fluoro and the like; $X^6$ is halo such as chloro or tert-butyl; $X^7$ is hydrogen or halo such as chloro and $X^8$ is hydrogen, halo such as chloro, methyl or trihalomethyl such as trifluoromethyl and the non-toxic, pharmaceutically acceptable acid addition salts thereof. Compositions containing this class of compounds exhibits particularly good diuretic and saluretic activity and represents a preferred subgroup of compositions within the scope of this invention.

The compositions containing the 2-aminophenols (I) as the active ingredient and also the 2-aminophenols (I) themselves are diuretic, saluretic and antihypertensive agents which can be administered in a wide variety of therapeutic dosages in conventional vehicles as, for example, by oral administration in the form of a tablet or capsules, by intravenous injection or oral solutions or suspensions. Also, the daily dosage of the products may be varied over a wide range varying from 50 to 2,000 mg. The product is preferably administered in subdivided doses in the form of scored tablets containing 5, 10, 25, 50, 100, 150, 250 and 500 milligrams of the active ingredient for the symptomatic adjustment of the dosage to the patient to be treated. An effective amount of the drug is ordinarily supplied at a dosage level of from about 1 mg. to about 50 mg./kg. of body weight. Preferably the range is from about 1 mg. to 7 mg./kg. of body weight. These dosages are well below the toxic or lethal dose of the products.

A suitable unit dosage form of the products of this invention can be administered by mixing 50 milligrams of a 2-aminomethylphenol (I) or a suitable salt thereof, with 149 mg. of lactose and 1 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Tablets may be prepared by mixing the active ingredient with conventional tableting ingredients such as calcium phosphate, lactose, corn starch or magensium stearate. The liquid forms in which the active ingredients may be incorporated include suitably flavored suspending or dispersing agents such as the synthetic and natural gums, for example, tragacanth, acacia, methylcellulose and the like. Other dispersing agents which may be employed include glycerin and the like. For parenteral administration sterile suspensions and solutions are desired. Isotonic preparations which generally contain a suitable preservative are employed when intravenous administration is desired.

It is also within the scope of this invention to combine two or more of the compounds of this invention in a unit dosage form or to combine one or more of the compounds of this invention with known diuretics, saluretics or antihypertensive agents or with other desired therapeutic and/or nutritive agents in dosage unit form.

The following examples are illustrative of how to prepare various compositions containing the active ingredients of this invention. However, said examples are merely illustrative and should not be construed as limiting the scope of the invention.

EXAMPLE A

Tablets containing 100 mg. of active ingredient per tablet

| | Per Tablet |
|---|---|
| 2-Aminomethyl-3,4-dichloro-6-trifluoromethylphenol hydrochloride | 100 mg. |
| Calcium Phosphate | 40 mg. |
| Lactose | 38 mg. |
| Corn Starch | 20 mg. |
| Magnesium Stearate | 2 mg. |
| | 200 mg. |

The 2-aminomethyl-3,4-dichloro-6-trifluoromethylphenol hydrochloride is mixed with the calcium phosphate and lactose for 10 minutes and then passed through a mill to reduce the particle size. The combined ingredients are remixed for 5 minutes and corn starch is passed through a No. 60 sieve (U.S. Sieve Series) onto the ingredients. The combined ingredients are again remixed for five minutes and then magnesium stearate is added through a No. 60 sieve. After remixing for 2 minutes the ingredients are compressed into tablets.

EXAMPLE B

Oral Elixir Dosage Form containing 100 mg. of active ingredient per five ml.

| | Per 5 ml. |
|---|---|
| 2-Aminomethyl-4,6-dichloro-3-fluorophenol hydrochloride | 100 mg |
| Sugar | 1.25 g |
| Glycerin | 0.50 ml |
| Ethyl Alcohol | 0.50 ml |
| Sorbic Acid | 5.0 mg |
| Sodium Bisulfite | 0.05 g |
| Tartrazine | 0.20 mg |
| Disodium Edetate | 0.0025 g |
| Flavoring Agent | 0.01 ml |
| Purified Water USP | q s |

The following procedure is conducted under a nitrogen atmosphere. The sugar is dissolved in purified water. Glycerin is added followed by the addition of sodium bisulfite and disodium edetate in an equal quantity of purified water. An ethanolic solution of 2-aminomethyl-4,6-dichloro-3-fluorophenol hydrochloride and sorbic acid is then added. To this solution is added an aqueous solution of tartrazine followed by the addition of the flavoring agent. Sufficient water is added to bring the final volume. The solution is stirred for 5 minutes, allowed to age overnight and filtered.

EXAMPLE C

Oral Suspension Dosage Form containing 100 mg. of active ingredient per five ml.

| | Per 5 ml. |
|---|---|
| 2-Aminomethyl-4,5,6-trichlorophenol | 100 mg |
| Vegetable gum Tragacanth | 15.0 mg |

-Continued

EXAMPLE C

Oral Suspension Dosage Form containing 100 mg. of active ingredient per five ml.

| | Per 5 ml. |
|---|---|
| Sorbic Acid | 5.0 mg |
| Sodium Bisulfite | 0.05 g |
| Dimethicone | 0.15 mg |
| Disodium Edetate | 0.0025 g |
| Ethyl Alcohol | 0.05 ml |
| Tartrazine | 0.25 mg |
| Sorbitol Solution USP | 2.50 ml |
| Flavoring Agent | 0.005 ml |
| Purified Water USP | q s |

The following procedure is conducted under a nitrogen atmosphere. After hydrating the tragacanth in purified water overnight the sorbitol solution is added. Sorbic acid in ethyl alcohol and sodium bisulfite and disodium edetate in an equal quantity of purified water are then successively added. After adding the antifoam agent, dimethicone, in an equal quantity of water the 2-aminomethyl-4,5,6-trichlorophenol is added. The 2-aminomethyl-4,5,6-trichlorophenol is added. The tartrazine is dissolved in an equal quantity of purified water and is added followed by the addition of a suitable flavoring agent. The suspension is brought to its final volume with purified water, stirred for 5 minutes and then passed through an homogenizer.

EXAMPLE D

Dry-filled capsules containing 50 mg. of active ingredient per capsule

| | Per Capsule |
|---|---|
| 2-Aminomethyl-4-tert-Butyl 6-methylphenol | 50 mg. |
| Lactose | 149 mg. |
| Magnesium Stearate | 1 mg. |
| Capsule (Size No. 1) | 200 mg. |

The 2-aminomethyl-4-tert-butyl-6-methylphenol is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules, tablets, elixirs and suspensions can be prepared by replacing the active ingredients of the above examples by any of the other compounds described in the foregoing general disclosure and the specific examples which follow.

In addition to the novel compositions disclosed herein there are also novel compounds which are also diuretics and saluretics which are useful in the treatment of conditions usually associated with edema and hypertension.

The novel products of this invention ($Ib$) are compounds of the following formula:

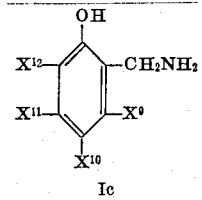

Ic wherein $X^9$ is hydrogen or halo such as chloro, fluoro, bromo or iodo; $X^{10}$ is halo such as chloro, fluoro, bromo or iodo, cycloalkyl, for example, cycloalkyl containing from five–six carbon atoms such as cyclopentyl, cyclohexyl and the like, mononuclear aryl such as phenyl and the like or tert-butyl; $X^{11}$ is hydrogen or halo such as chloro, bromo, fluoro or iodo, and $X^{12}$ is halo such as chloro, bromo, fluoro or iodo, methyl or trihalomethyl such as trifluoromethyl and the like with the provisos that when the $X^{10}$ and $X^{12}$ substituents are halo the $X^9$ and $X^{11}$ substituents are also halo and when the $X^{10}$ substituent is tert-butyl the $X^{12}$ substituent is methyl. Also included are their non-toxic, pharmaceutically acceptable salts, preferably the non-toxic, pharmaceutically acceptable acid addition salts derived from hydrochloric acid, hydrobromic acid, hydroiodic acid, sulfuric acid, methanesulfonic acid, isethionic acid and the like; salts may also be prepared from the alkali metal bases such as sodium hydroxide, potassium hydroxide and the like.

Among the novel products of this invention the following 2-aminomethylphenols (Ic) represent a preferred embodiment and have the following structural formula:

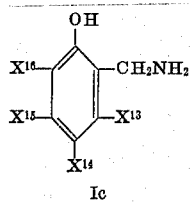

Ic wherein $X^{13}$ is hydrogen or halo such as chloro, fluoro, bromo or iodo; $X^{14}$ is halo such as chloro, fluoro, bromo or iodo, phenyl or tert-butyl; $X^{15}$ is hydrogen or halo such as chloro, fluoro, bromo or iodo and $X^{16}$ is methyl, halo such as chloro, fluoro, bromo or iodo and trihalomethyl such as trifluoromethyl with the provisos that when the $X^{14}$ and $X^{16}$ substituents are halo the $X^{13}$ and $X^{15}$ substituents are halo and when the $X^{14}$ substituent is tert-butyl the $X^{16}$ substituent is methyl. These products exhibit particularly good diuretic and saluretic activity.

The 2-aminomethylphenols (I) described above as the active compounds of the compositions of this invention and also the novel products (Ic) of this invention may be prepared by one of two methods which comprises (1) treating an N-(2-hydroxybenzyl)carboxamide (II) with an aqueous solution in the presence of an acid or base or (2) subjecting a substituted 2-hydroxybenzaldoxime (III) to reduction.

The first of the above-mentioned processes comprises treating an N-(2-hydroxybenzyl)carboxamide (II, infra) with an aqueous solution in the presence of an acid, preferably a mineral acid such as hydrochloric acid, hydrobromic acid, sulfuric acid, hydroiodic acid and the like; in addition to the mineral acids, bases may also be employed, for example, the alkali metal bases such as sodium hydroxide, potassium hydroxide and the like. Any solvent which is inert or substantially inert to the reactants may be employed such as ethanol, acetic acid and the like. The reaction may be conducted at a temperature in the range of from about 20° C to about 110° C. for a period of time of from about 15 minutes to about 5 hours; however, the reaction is generally conducted at the reflux temperature of the particular solvent employed for a period of time of about 1½ hours. The following equation illustrates this reaction employing a mineral acid, $HR^1$, such as hydrochloric acid, hydrobromic acid, hydroiodic acid, sulfuric acid and the like.

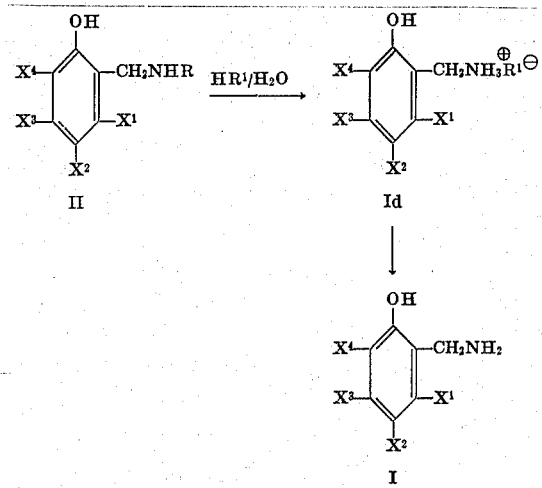

wherein $X^1$, $X^2$, $X^3$ and $X^4$ are as defined above; R is an acyl radical, for example, formyl, haloacetyl such as chloroacetyl and the like, carbamoyl, mononuclear aroyl such as benzoyl and the like, hydroxy substituted mononuclear aroyl such as o-hydroxybenzoyl and the like or trihalomethylcarbonyl such as trichloromethylcarbonyl and the like and $R^{1\ominus}$ is the anion derived from an acid, for example, a mineral acid such as hydrochloric acid, hydrobromic acid, hydroiodic acid, sulfuric acid and the like. The product is usually obtained in the form of an acid addition salt and the free amine can be generated by known neutralization methods.

The second method for preparing the 2-aminomethylphenols (I) comprises subjecting a substituted 2-hydroxybenzaldoximine (III, infra) to reduction, for example, by hydrogenation such as catalytic hydrogenation employing a noble metal such as rhodium, ruthenium and the like, preferably on a carrier such as carbon and the like. The reduction is generally conducted employing as the solvent a lower alkanol such as ethanol, methanol and the like in the presence of a mineral acid such as sulfuric acid and the like. The following equation illustrates this process:

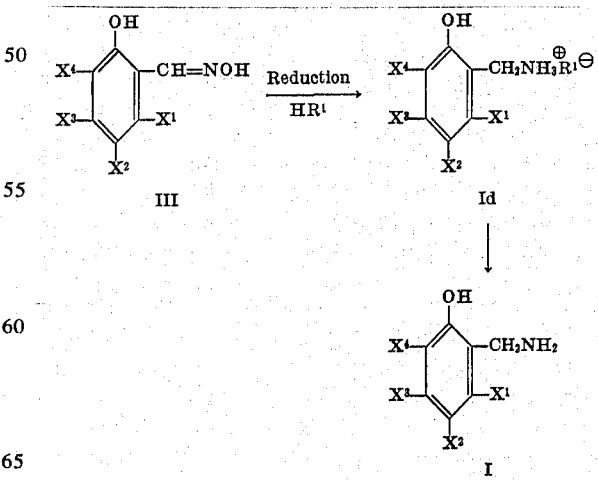

wherein $X^1$, $X^2$, $X^3$, $X^4$ and $R^{1\ominus}$ are as defined above. The product is usually obtained in the form of an acid addition salt and the free amine can be generated by known neutralization methods.

The N-(2-hydroxybenzyl)carboxamides (II, supra) employed as starting materials in the preparation of the 2-aminomethylphenols (I) are prepared by treating an appropriately substituted phenol (IV, infra) with an N-hydroxymethylcarboxamide, for example, N-hydroxymethylurea, 2-halo-N-hydroxymethylacetamide such as 2-chloro-N-hydroxymethylacetamide and the like, N-hydroxymethyl mononuclear arylcarboxamide such as N-hydroxymethylbenzamide and the like, N-hydroxymethyl hydroxy substituted arylcarboxamide such as N-hydroxymethylsalicylamide and the like or N-hydroxymethyl trihaloacetamide such as N-hydroxymethyltrichloroacetamide and the like in the presence of a strong mineral acid such as hydrochloric acid, sulfuric acid and the like. The reaction may be conducted employing as the solvent an excess of the mineral acid employed or with a solvent which is inert or substantially inert to the reactants employed, for example, a lower alkanol such as ethanol and the like or a lower alkanoic acid such as acetic acid and the like. The N-(2-hydroxybenzyl)carboxamides (II) may be isolated and purified; however, it has been found that by employing the crude N-(2-hydroxybenzyl)carboxamides satisfactory results are obtained. The following equation illustrates this process:

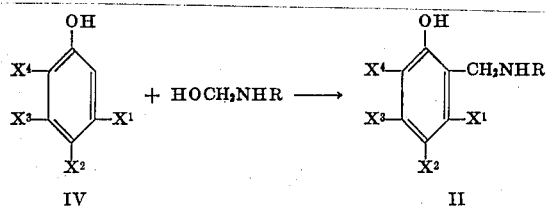

wherein $X^1$, $X^2$, $X^3$, $X^4$ and R are as defined above.

The 2-hydroxybenzaldoximes (III, supra) employed may be prepared by treating an appropriate phenol with chloroform in the presence of a base or a mixture of bases such as sodium carbonate and calcium hydroxide which yields the correspondingly substituted 2-hydroxybenzaldehyde then the 2-hydroxybenzaldehyde (V, infra) is treated with a hydroxylamine hydrohalide such as hydroxylamine hydrochloride and the like in the presence of a base such as sodium acetate and the like. This reaction is generally conducted in a lower alkanol solvent such as ethanol and the like. The reaction is conveniently conducted at the boiling point of the particular solvent employed. The following equation illustrates this process:

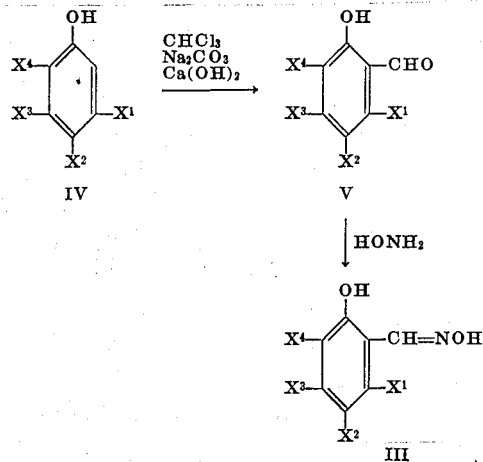

wherein $X^1$, $X^2$, $X^3$ and $X^4$ are as defined above.

All of the phenols (III) employed in the preparation of the N-(2-hydroxybenzyl)carboxamides (III) are known except for 4,5-dichloro-2-trifluoromethylphenol which is prepared as follows:

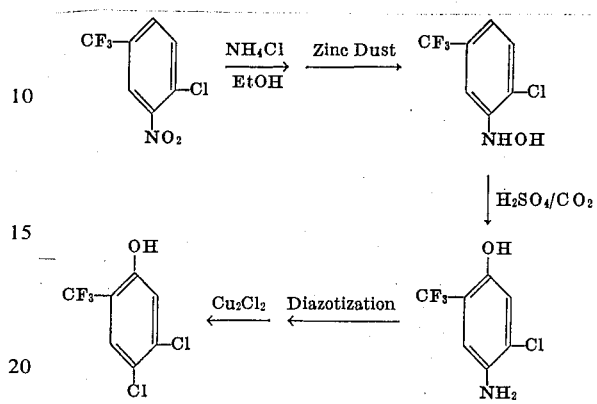

The following examples illustrate the preparation of the 2-aminomethylphenols (I). However, the examples are illustrative only and it will be apparent to those having ordinary skill in the art that all of the products embraced by formula I, supra, may also be prepared in an analogous manner by substituting the appropriate starting materials for those set forth in the examples.

EXAMPLE 1

2-Aminomethyl-3,4,6-trichlorophenol Hydrochloride

A well-pulverized mixture of 2,4,5-trichlorophenol (39.4 g., 0.2 mole) and 2-chloro-N-hydroxymethylacetamide (24.6 g., 0.2 mole) is added in portions with stirring during 15 minutes to concentrated sulfuric acid (100 ml.) and cooled in an ice bath so that the internal temperature is kept below 20° C. The mixture is then stirred at about 25° C. for 24 hours. The olive drab solution is poured onto ice (500 g.) and the 2-chloro-N-(2-hydroxy-3,5,6-trichlorobenzyl)acetamide that separates as a beige powder is collected, washed with water, dried and added to a mixture of ethanol (500 ml.) and 12 N hydrochloric acid (150 ml.). The solution is refluxed for 1 hour and kept at 5° C. for 16 hours. The colorless needles that separate are recrystallized from a mixture of ethanol and 12 N hydrochloric acid (4:1) to obtain 2-aminomethyl-3,4,6-trichlorophenol hydrochloride (14.75 g.), m.p. 244.5°–245° C.

Elemental analysis for $C_7H_6Cl_3NO \cdot HCl$:
Calc.: C, 31.97; H, 2.68; N, 5.33;
Found: C, 32.20; H, 2.73; N, 5.31.

By substituting for the 2-chloro-N-hydroxymethylacetamide of Example 1 an equimolar quantity of N-hydroxymethylurea, N-hydroxymethylbenzamide, N-hydroxymethylsalicylamide, N-hydroxymethyltrichloroacetamide, N-hydroxymethylformamide and by following substantially the procedure described therein, there is obtained N-(2-hydroxy-3,5,6-trichlorobenzyl)urea, N-(2-hydroxy-3,5,6-trichlorobenzyl)benzamide, N-(2-hydroxy-3,5,6-trichlorobenzyl)salicylamide, N-(2-hydroxy-3,5,6-trichlorobenzyl)trichloroacetamide and N-(2-hydroxy-3,5,6-trichlorobenzyl)formamide, respectively, which compounds upon treatment with concentrated hydrochloric acid afford 2-aminomethyl-3,4,6-trichlorophenol hydrochloride.

EXAMPLE 2

2-Aminomethyl-4-tert-butyl-6-methylphenol Hydrochloride

2-Methyl-4-tert-butylphenol (8.6 g., 0.05 mole) and 2-chloro-N-hydroxymethylacetamide (0.05 mole) are dissolved in absolute ethanol (30 ml.) containing concentrated hydrochloric acid (1 ml.). The mixture is refluxed for 30 minutes, cooled slightly and additional concentrated hydrochloric acid (15 ml.) is added. The solution is refluxed for an additional one half hour during which time a solid begins to separate. After cooling the mixture to −20° C. the solid is collected and recrystallized from a mixture of ethanol and concentrated hydrochloric acid (4:1) to afford 3.06 g. of 2-aminomethyl-4-tert-butyl-6-methylphenol hydrochloride, m.p. 231.5°–232.5° C.

Elemental analysis for $C_{12}H_{19}NO_4 \cdot HCl$:
Calc.: C, 62.73; H, 8.77; N, 6.10;
Found: C, 62.73; H, 8.82; N, 6.02.

EXAMPLE 3

2-Aminomethyl-4-chloro-3,5-dimethoxyphenol Hydrochloride

4-Chloro-3,5-dimethoxyphenol (9.4 g., 0.05 mole) is dissolved in a mixture of concentrated sulfuric acid (2.5 ml.) and acetic acid (50 ml.). 2-Chloro-N-hydroxymethylacetamide (6.15 g.) is added with stirring at about 20° C. over a 10-minute period. The mixture is stirred for 1 hour and then poured into ice water. The 2-chloro-N-(5-chloro-4,6-dimethoxy-2-hydroxybenzyl)acetamide that separates is collected, washed with water, dried in air and added to a mixture of absolute ethanol (70 ml.) and concentrated hydrochloric acid (15 ml.). The mixture is refluxed for 3 hours. The beige solid (6.38 g.) that separates, on cooling to 5° C., is collected and recrystallized from a mixture of 2-propanol and water (10:1) to obtain 1.53 g. of 2-aminomethyl-4-chloro-3,5-dimethoxyphenol hydrochloride, m.p. 220°–222° C. (dec.).

Elemental analysis for $C_9H_{12}ClNO_3 \cdot HCl$:
Calc.: C, 42.54; H, 5.16; N, 5.51;
Found: C, 42.69; H, 5.11; N, 5.36.

EXAMPLE 4

2-Aminomethyl-4,5,6-trichlorophenol Hydrochloride

By following substantially the procedure described in Example 1 and by substituting 2,3,4-trichlorophenol (5.96 g., 0.03 mole) for the 2,4,5-trichlorophenol described therein, there is obtained 1.31 g. of 2-aminomethyl-4,5,6-trichlorophenol hydrochloride, m.p. 228°–229.5° C. (dec.) from a mixture of ethanol and concentrated hydrochloric acid (1:1).

Elemental analysis for $C_7H_6Cl_3NO \cdot HCl$:
Calc.: C, 31.97; H, 2.68; N, 5.33;
Found: C, 31.97; H, 2.68; N, 5.29.

EXAMPLE 5

2-Aminomethyl-4,6-dichloro-3-fluorophenol Hydrochloride

By following substantially the procedure described in Example 1 and by substituting 2,4-dichloro-5-fluorophenol (1.8 g.) for the 2,4,5-trichlorophenol described therein, there is obtained 0.72 g. of 2-aminomethyl-4,6-dichloro-3-fluorophenol hydrochloride, m.p. 231°–232° C. (dec.) after recrystallizing first from ethanol and then from a mixture of ethanol and diethyl ether.

Elemental analysis for $C_7H_6Cl_2FNO \cdot HCl$:
Calc.: C, 34.11; H, 2.86; N, 5.68;
Found: C, 34.08; H, 2.97; N, 5.67.

EXAMPLE 6

2-Aminomethyl-3,4,5,6-tetrachlorophenol Hydrochloride

By substituting 2,3,4,5-tetrachlorophenol (6.9 g., 0.03 mole) for the 2,4,5-trichlorophenol of Example 1 and by following substantially the procedure described therein, there is obtained, after recrystallization from a mixture of ethanol and concentrated hydrochloric acid (1:1), 0.9 g. of 2-aminomethyl-3,4,5,6-tetrachlorophenol hydrochloride, m.p. 234° C. (dec.).

Elemental analysis for $C_7H_5Cl_4NO \cdot HCl$:
Calc.: C, 28.28; H, 2.03; N, 4.71;
Found: C, 28.54; H, 2.10; N, 4.78.

EXAMPLE 7

2-Aminomethyl-3,4,5-trichlorophenol Hydrochloride

By substituting 3,4,5-trichlorophenol (1.97 g., 0.01 mole) for the 2,4,5-trichlorophenol of Example 1 and by following substantially the procedure described therein, there is obtained, after recrystallization from a mixture of ethanol and concentrated hydrochloric acid (1:1), 1.5 g. of 2-aminomethyl-3,4,5-trichlorophenol hydrochloride, m.p. 270°–271° C. (dec.).

Elemental analysis for $C_7H_6Cl_3NO \cdot HCl$:
Calc.: C, 31.97; H, 2.68; N, 5.33;
Found: C, 31.80; H, 2.68; N, 5.38.

EXAMPLE 8

2-Aminomethyl-3,4-dichloro-6-trifluoromethylphenol Hydrochloride

Step A: N-(2-Chloro-5-trifluoromethyl)phenylhydroxylamine

4-Chloro-3-nitrobenzotrifluoride (45.12 g., 0.2 mole) is dissolved in ethanol (210 ml.). The mixture is heated to boiling and a solution of ammonium chloride (4.2 g.) in water (50 ml.) is added. The mixture is again heated to boiling, the heat is removed and zinc dust (about 38 g.) is added portionwise to the stirred mixture over a 30-minute period at such a rate that the mixture continues to boil spontaneously. After refluxing for an additional 1/2 hour the mixture is filtered, cooled and diluted with water (500 ml.). The oil that separates is extracted with ether. The ether extract is dried over sodium sulfate, filtered and the ether removed to afford 38.0 g. of N-(2-chloro-5-trifluoromethyl)phenylhydroxylamine.

Step B: 4-Amino-3-chloro-6-trifluoromethylphenol

N-(2-Chloro-5-trifluoromethyl)phenylhydroxylamine (38 g.) is dissolved in dilute sulfuric acid (1:10 by volume 350 ml.). The mixture is heated at 80°–85° C. under one atmosphere of carbon dioxide for 45 minutes, cooled and extracted with ether. Then the aqueous phase is treated with sodium hydroxide (10 percent) until it is almost neutral and finally neutralized with sodium bicarbonate. The solid that separates is extracted with ether, and the ether solution dried over sodium sulfate. The solution is filtered and the ether removed to afford 4-amino-3-chloro-6-trifluoromethylphenol (8.36 g.), m.p. 181°–183° C. (dec.), after recrystallization from benzene.

Step C: 4,5-Dichloro-2-trifluoromethylphenol

A solution of cuprous chloride is prepared by dissolving copper sulfate (15.62 g.) and sodium chloride (4.38 g.) in boiling water (50 ml.). To the hot solution is added portionwise a solution of sodium bisulfite (5.5 g.) and sodium hydroxide (3.74 g.) in water (35 ml.). The white precipitate of cuprous chloride is allowed to settle. The aqueous layer is decanted and the residue is washed once with water by decantation and dissolved in concentrated hydrochloric acid (30 ml.). 4-Amino-3-chloro-6-trifluoromethylphenol (10.6 g.) in a mixture of concentrated hydrochloric acid (80 ml.) and water (220 ml.) is treated with sodium nitrite (3.5 g.) in water (10 ml.) at 0°–5° C. The ice-cold solution is added with stirring to the ice-cold solution of cuprous chloride prepared above. The mixture is allowed to warm to 20°–25° C. and then heated at 80°–85° C. for 1 hour. The mixture then is steam distilled to obtain 6.28 g. of 4,5-dichloro-2-trifluoromethylphenol, m.p. 60°–61° C.

Step D: 2-Aminomethyl-3,4-dichloro-6-trifluoromethylphenol Hydrochloride -dichloro- By following substantially the procedure described in Example 1 and by substituting 4,5-dichloro-2-trifluoromethylphenol (5.28 g.) for the 2,4,5-trichlorophenol-5-methylphenol described therein, there is obtained, after recrystallization from a mixture of ethanol and concentrated hydrochloric acid (1:2), 1.17 g. of 2-aminomethyl-3,4-dichloro-6-trifluoromethylphenol hydrochloride, m.p. 199°–200.5° C.

Elemental analysis for $C_8H_6Cl_2F_3NO \cdot HCl$:
Calc.: C, 32.40; H, 2.38; N, 4.72;
Found: C, 32.48; H, 2.43; N, 4.76.

EXAMPLE 9

2-Aminomethyl-6-chloro-4-phenylphenol Hydrochloride

By substituting 2-chloro-4-phenylphenol (10.23 g., 0.05 mole) for the 2,4,5-trichlorophenol of Example 1 and by following substantially the procedure described therein, there is obtained, after recrystallization from a mixture of ethanol and concentrated hydrochloric acid, 2.85 g. of 2-aminomethyl-6-chloro-4-phenylphenol hydrochloride, m.p. 241.5°–242° C.

Elemental analysis for $C_{13}H_{12}ClNO \cdot HCl$:
Calc.: C, 57.80; H, 4.85; N, 5.18;
Found: C, 57.43; H, 4.86; N, 5.12.

EXAMPLE 10

2-Aminomethyl-6-chloro-4-cyclohexylphenol Hydrochloride

By substituting 4-chloro-2-cyclohexylphenol (8.7 g., 0.036 mole) for 2,4,5-trichlorophenol of Example 1 and following substantially the procedure described therein, there is obtained, after recrystallization from a mixture of ethanol and concentrated hydrochloric acid (1:1), 3.5 g. of 2-aminomethyl-6-chloro-4-cyclohexylphenol hydrochloride, m.p. 250°–250.5° C.

Elemental analysis for $C_{13}H_{18}ClNO \cdot HCl$:
Calc.: C, 56.53; H, 6.93; N, 5.07;
Found: C, 56.71; H, 7.15; N, 5.06.

EXAMPLE 11

2-Aminomethyl-3,5-Di-tert-butylphenol Hydrochloride

By following substantially the procedure described in Example 3 and by substituting 3,5-di-tert-butylphenol (10.3 g.) for the 4-chloro-3,5-dimethoxyphenol described therein there is obtained, after recrystallization from a mixture of ethanol and concentrated hydrochloric acid (1:2), 5.2 g. of 2-aminomethyl-3,5-di-tert-butylphenol hydrochloride, m.p. 200°–200.5° C.

Elemental analysis for $C_{15}H_{25}NO \cdot HCl$:
Calc.: C, 66.28; H, 9.64; N, 5.15;
Found: C, 66.44; H, 9.99; N, 5.08.

EXAMPLE 12

2-Aminomethyl-4-chloro-6-methylphenol Hydrochloride

A well-pulverized mixture of 4-chloro-2-methylphenol (7.1 g., 0.05 mole) and 2-chloro-N-hydroxymethylacetamide (6.15 g., 0.05 mole) is added, in portions, with stirring and cooling to keep the internal temperature below 20° C., to concentrated sulfuric acid (50 ml.). The mixture then is stirred at about 25° C. for 20 hours, poured onto ice (about 200 g.) to afford crude 2-chloro-N-(4-chloro-2-hydroxy-3-methylbenzyl)-acetamide which is dissolved in absolute ethanol (100 ml.) containing concentrated hydrochloric acid (30 ml.). The mixture is refluxed for 1½ hours, cooled to −20° C. and the precipitate is collected, washed with absolute ethanol and dried at 60° C. The dried solid is recrystallized from a mixture of absolute ethanol and water (1:1) to afford 3.75 g. of 2-aminomethyl-4-chloro-6-methylphenol hydrochloride, m.p. 258.5°–259° C.

Elemental analysis for $C_8H_{10}ClNO \cdot HCl$:
Calc.: C, 46.18; H, 5.33; N, 6.73;
Found: C, 46.32; H, 5.58; N, 6.73.

EXAMPLE 13

2-Aminomethyl-3,4,6-trimethylphenol Hydrochloride 2,3,5-Trimethylphenol (4.08 g., 0.03 mole) and N-hydroxymethyl-2-chloroacetamide (3.71 g., 0.03 mole) is dissolved in absolute ethanol (30 ml.) containing concentrated hydrochloric acid (1 ml.). The mixture is refluxed for 30 minutes, cooled slightly and additional concentrated hydrochloric acid (15 ml.) is added. The solution is refluxed for 1/2 hour during which time a solid begins to separate. After cooling the mixture to −20° C. the solid is collected, recrystallized first from a mixture of ethanol and concentrated hydrochloric acid (2:1) and then from a mixture of ethanol and water (20:1) to obtain 2-aminomethyl-3,4,6-trimethylphenol hydrochloride (6.8 g.), m.p. 253.5°–254° C.

Elemental analysis for $C_{10}H_{15}NO \cdot HCl$:
Calc.: C, 59.55; H, 8.00; N, 6.94;
Found: C, 59.64; H, 7.83; N, 6.95.

EXAMPLE 14

2-Aminomethyl-3,4,5,6-tetramethylphenol Hydrochloride

By following substantially the procedure described in Example 12 and by substituting 2,3,4,5-tetramethylphenol (7.5 g., 0.05 mole) for the 4-chloro-2-methylphenol described therein, there is obtained, after recrystallization from a mixture of ethanol and concentrated hydrochloric acid (2.5:1), 5.25 g. of 2-aminomethyl-3,4,5,6-tetramethylphenol hydrochloride, m.p. 248.5°–249° C.

Elemental analysis for $C_{11}H_{17}NO \cdot HCl$:
Calc.: C, 61.25; H, 8.41; N, 6.49;
Found: C, 61.14; H, 8.19; N, 6.27.

EXAMPLE 15

2-Aminomethyl-3,4,6-trichlorophenol

2-Aminomethyl-3,4,6-trichlorophenol hydrochloride (1.0 g.) is suspended in water and dissolved by addition of 40 percent aqueous solution of sodium hydroxide. The solution is acidified with acetic acid and the product obtained is recrystallized from ethanol to obtain substantially pure 2-aminomethyl-3,4,6-trichlorophenol, m.p. 190.5°–191° C.

Elemental analysis for $C_7H_6Cl_3NO$:
Calc.: C, 37.12; H, 2.67; N, 6.19;
Found: C, 37.08; H, 2.89; N, 6.18.

EXAMPLE 16

2-Aminomethyl-4-Methyl-6-Propylphenol Hydrochloride

By following substantially the procedure of Example 2 and by substituting for the 2-methyl-4-tert-butylphenol described there is an equimolar amount of 2-n-propyl-4-methylphenol (7.15 g., 0.05 mole), there is obtained 1.5 g. of 2-aminomethyl-4-methyl-6-propylphenol hydrochloride, m.p. 185°–186° C., after recrystallization from a mixture of ethanol and concentrated hydrochloric acid (1:1).

Elemental analysis for $C_{11}H_{17}NO \cdot HCl$:
Calc.: C, 61.24; H, 8.41; N, 6.49;
Found: C, 61.36; H, 8.43; N, 6.54.

EXAMPLE 17

2-Aminomethyl-3,4,5-Trimethylphenol Hydrochloride

By following substantially the procedure as described in Example 2 and by substituting 3,4,5-trimethylphenol (61.81 g., 0.05 mole) for the 2-methyl-4-tert-butylphenol described therein, there is obtained, after recrystallization from a mixture of concentrated hydrochloric acid and water (1:10), 0.7 g. of 2-aminomethyl-3,4,5-trimethylphenol hydrochloride, m.p. 270°–271° C.

EXAMPLE 18

2-Aminomethyl-4-chloro-3-methylphenol Hydrochloride

By following substantially the procedure described in Example 1 and by substituting 4-chloro-3-methylphenol (7.1 g., 0.05 mole) for the 2,4,5-trichlorophenol described therein there is obtained, after recrystallization from a mixture of ethanol and concentrated hydrochloric acid (1:1), 1.2 g. of 2-aminomethyl-4-chloro-3-methylphenol hydrochloride, m.p. 260° C.

Elemental analysis for $C_8H_{10}ClNO \cdot HCl$:
Calc.: C, 46.18; H, 5.33; N, 6.73;
Found: C, 46.54; H, 5.51; N, 6.33.

EXAMPLE 19

2-Aminomethyl-6-chloro-4-fluorophenol Hydrochloride

By following substantially the procedure described in Example 1 and by substituting 2-chloro-4-fluorophenol (12.5 g.) for the 2,4,5-trichlorophenol described therein there is obtained, after recrystallization from a mixture of ethanol and water (1:1), 2-aminomethyl-6-chloro-4-fluorophenol hydrochloride, m.p. 228°–229° C.

Elemental analysis for $C_7H_7ClFNO \cdot HCl$:
Calc.: C, 39.65; H, 3.80; N, 6.61;
Found: C, 39.56; H, 3.81; N, 6.53.

EXAMPLE 20

2-Aminomethyl-4-chloro-6-fluorophenol Hydrochloride

By following substantially the procedure described in Example 1 and by substituting 4-chloro-2-fluorophenol (6.4 g.) for the 2,4,5-trichlorophenol described therein there is obtained, after recrystallization from a mixture of ethanol ether (1:20), 2-aminomethyl-4-chloro-6-fluorophenol hydrochloride, m.p. 217.5°–218° C.

Elemental analysis for $C_7H_7ClFNO \cdot HCl$:
Calc.: C, 39.65; H, 3.80; N, 6.61;
Found: C, 39.25; H, 4.01; N, 6.55.

EXAMPLE 21

2-Aminomethyl-4-n-butyl-6-methylphenol Hydrochloride

By following substantially the procedure described in Example 3 and by substituting 4-n-butyl-2-methylphenol (4.6 g., 0.028 mole) for the 4-chloro-3,5-dimethoxyphenol described therein there is obtained, after recrystallization from a mixture of ethanol and concentrated hydrochloric acid (5:1), 2-aminomethyl-4-n-butyl-6-methylphenol hydrochloride, m.p. 240°–243° C.

Elemental analysis for $C_{12}H_{19}NO \cdot HCl$:
Calc.: C, 62.73; H, 8.77; N, 6.10;
Found: C, 62.98; H, 8.57; N, 5.97.

EXAMPLE 22

2-Aminomethyl-6-methyl-4-(1-methylhexyl)phenol Hydrochloride

By following substantially the procedure described in Example 3 and by substituting 2-methyl-4-(1-methylhexyl)phenol for the 4-chloro-3,5-dimethoxyphenol described therein there is obtained, after recrystallization from a mixture of ethanol and ether (1:10), 2-aminomethyl-6-methyl-4-(1-methylhexyl)-phenol hydrochloride, m.p. 194.5°–195.5° C.

Elemental analysis for $C_{15}H_{25}NO \cdot HCl$:
Calc.: C, 66.28; H, 9.64; N, 5.15;
Found: C, 66.48; H, 9.62; N, 5.03;

EXAMPLE 23

2-Aminomethyl-4,6-Di-n-propylphenol Hydrochloride

By following substantially the procedure described in Example 3 and by substituting 2,4-di-n-propylphenol (5.4 g., 0.03 mole) for the 4-chloro-3,5-dimethoxyphenol described therein there is obtained, after recrystallization from ethanol and concentrated hydrochloric acid (2.5:1) 1.7 g. of 2-aminomethyl-4,6-di-n-propylphenol hydrochloride, m.p. 158°–160° C.

Elemental analysis for $C_{13}H_{21}NO \cdot HCl$:
Calc.: C, 64.05; H, 9.10; N, 5.75;
Found: C, 64.12; H, 8.93; N, 5.63.

EXAMPLE 24

2-Aminomethyl-3,4-dichlorophenol

Step A: 5,6-Dichlorosalicyl Aldehyde

To an aqueous mixture of calcium hydroxide, sodium carbonate and 3,4-dichlorophenol (82 g., 0.5 mole), chloroform (108 g., 1.5 mole) is added doopwise with stirring over 1¾ hours. Heating and stirring is continued for an additional 6 hours. The mixture is acidified with concentrated hydrochloric acid (60 ml.) and steam distilled. The distillate (2,500 ml.) is cooled and the solid that separates is recrystallized from ethanol to afford 16.4 g. of 5,6-dichloro-salicyl aldehyde, m.p. 95°–97° C.

Elemental analysis for $C_7H_4Cl_2O_2$:
Calc.: C, 44.01; H, 2.11; Cl, 37.12;
Found: C, 44.32; H, 2.42; Cl, 36.99.

Step B: 5,6-Dichlorosalicylaldoxime 5,6-Dichlorosalicyl aldehyde (5.73 g., 0.03 mole) is dissolved in warm ethanol (30 ml.). To this is added a solution of hydroxylamine hydrochloride (96 percent, 6.75 g., 0.01 mole) and sodium carbonate (0.55 g., 0.005 mole) in water (15 ml.). The clear solution is heated to boiling for 1 hour and the ethanol removed. The solid is recrystallized from a mixture of ethanol and water (10:1) to afford 5.5 g. of 5,6-dichlorosalicylaldoxime, m.p. 179°–182° C.

Elemental analysis for $C_7H_5Cl_2NO_2$:
Calc.: C, 40.81; H, 2.45; N, 6.80;
Found: C, 41.13; H, 2.55; N, 6.64.

Step C: 2-Aminomethyl-3,4-Dichlorophenol 5,6-Dichlorosalicylaldoxime (5.15 g., 0.025 mole) is dissolved in a solution of ethanol (100 ml.) and sulfuric acid (98 percent, 10 ml.). Rhodium on carbon (5 percent, 1 g.) is added and the mixture is hydrogenated under 3 atmospheres of hydrogen pressure. In four hours the uptake of hydrogen ceases and the mixture is poured into water and filtered. The solution is basified with an aqueous ammonium hydroxide solution to afford crude 2-aminomethyl-3,4-dichlorophenol which is dissolved in a dilute aqueous sodium hydroxide solution, filtered, and acidified with acetic acid. The solid is recrystallized to afford 1.6 g. of substantially pure 2-aminomethyl-3,4-dichlorophenol, m.p. 153°–156° C.

Elemental analysis for $C_7H_7Cl_2NO_2$:
Calc.: C, 43.78; H, 3.67; N, 7.29;
Found: C, 43.53; H, 3.94; N, 6.99.

What is claimed is:

1. A method for the treatment of edema and hypertension which comprises administering to a patient in need of such treatment a unitary dosage of from 50 mg. to 500 mg. of a diuretic and saluretic compound of the formula:

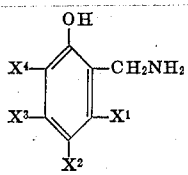

wherein $X^1$ is hydrogen, lower alkyl, halo or lower alkoxy; $X^2$ is halo, lower alkyl, phenyl or lower cycloalkyl; $X^3$ is hydrogen, lower alkyl, halo or lower alkoxy and $X^4$ is hydrogen, halo, lower alkyl or trifluoromethyl; or a nontoxic, pharmaceutically acceptable salt thereof in a total daily dose of from 50 mg. to 2,000 mg.

2. The method of claim 1 wherein the active ingredient has the formula:

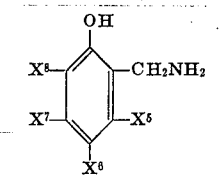

wherein $X^5$ is hydrogen or halo; $X^6$ is halo or tert-butyl; $X^7$ is hydrogen or halo and $X^8$ is hydrogen, halo, methyl or trifluoromethyl; or a non-toxic, pharmaceutically acceptable acid addition salt thereof.

3. The method of claim 2 wherein the active ingredient is 2-aminomethyl-3,4,6-trichlorophenol hydrochloride.

4. The method of claim 2 wherein the active ingredient is 2-aminomethyl-4-tert-butyl-6-methylphenol hydrochloride.

5. The method of claim 2 wherein the active ingredient is 2-aminomethyl-4,5,6-trichlorophenol hydrochloride.

6. The method of claim 2 wherein the active ingredient is 2-aminomethyl-4,6-dichloro-3-fluorophenol hydrochloride.

7. The method of claim 2 wherein the active ingredient is 2-aminomethyl-3,4,5,6-tetrachlorophenol hydrochloride.

8. The method of claim 2 wherein the active ingredient is 2-aminomethyl-3,4,5-trichlorophenol hydrochloride.

9. The method of claim 2 wherein the active ingredient is 2-aminomethyl-3,4-dichloro-6-trifluoromethylphenol hydrochloride.

* * * * *